US008485415B2

(12) United States Patent
Kato et al.

(10) Patent No.: US 8,485,415 B2
(45) Date of Patent: Jul. 16, 2013

(54) METHOD FOR MANUFACTURING PANEL STRUCTURE (75) Inventors: Yoshinori Kato, Tokyo (JP); Kazushige Yamasu, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/229,832

(22) Filed: Sep. 12, 2011

(65) Prior Publication Data
US 2012/0132342 A1 May 31, 2012

(30) Foreign Application Priority Data

Nov. 26, 2010 (JP) ................................. 2010-264165
Dec. 21, 2010 (JP) ................................. 2010-284853

(51) Int. Cl.
*B23K 20/12* (2006.01)
(52) U.S. Cl.
USPC ...................................... 228/112.1; 156/73.5
(58) Field of Classification Search
USPC ...................................... 228/112.1; 156/73.5
See application file for complete search history.

(56) References Cited

U.S. PATENT DOCUMENTS 6,364,250 B1    4/2002   Brinck et al.
2006/0060635 A1*  3/2006   Slattery et al. ............. 228/112.1
2007/0181643 A1*  8/2007   Craig et al. ................... 228/101

FOREIGN PATENT DOCUMENTS

| JP | 3-9307       | 1/1991 |
| JP | 11-047959    | 2/1999 |
| JP | 2000-103397  | 4/2000 |
| JP | 2002-321059  | 11/2002 |
| JP | 2005-095951  | 4/2005 |
| JP | 2007-029981  | 2/2007 |
| JP | 2010-042434  | 2/2010 |
| JP | 2010-094696  | 4/2010 |

OTHER PUBLICATIONS

Japanese Notice of Reasons for Rejection issued Oct. 2, 2012 in corresponding Japanese Application No. 2010-284853.
Japanese Notice of Allowance issued Mar. 5, 2013 in corresponding Japanese Application No. 2010-284853.

* cited by examiner

*Primary Examiner* — Nicholas P D'Aniello
(74) *Attorney, Agent, or Firm* — Wenderoth, Lind & Ponack, L.L.P.

(57) ABSTRACT

A method for manufacturing a panel structure in which a reference position of a first frame in an axial direction is first welded to one face of a face plate, a not-yet-welded position closest to the reference position in the axial direction is second welded to the one face, and welding is performed discontinuously to the one face from the not-yet-welded position closest to the reference position at portions on both sides in the axial direction on the basis of the reference position.

11 Claims, 6 Drawing Sheets

METHOD FOR MANUFACTURING PANEL STRUCTURE

BACKGROUND OF THE INVENTION

I. Technical Field

The present invention relates to a method for manufacturing a panel structure which is manufactured by joining a frame to one face of a face plate.

The application concerned is to claim the right of priority to Patent Application No. 2010-264165 filed on Nov. 26, 2010 in Japan and Patent Application No. 2010-284853 filed on Dec. 21, 2010 in Japan, with the content cited herewith.

II. Background Art

A panel structure is disclosed, for example, in U.S. Pat. No. 6,364,250.

The above panel structure is provided with a face plate, a plurality of ribs mounted parallel to each other on one face of the face plate and a plurality of frames mounted parallel to each other on the one face in a direction intersecting a rib direction in which each of these ribs extends.

This panel structure is manufactured in such a manner so as to provide a skin panel having a plurality of ribs mounted parallel to each other on one face of the face plate and a plurality of frames are welded on one face of the skin panel. When welding the frames to the skin panel, the frames are discontinuously welded to portions between the plurality of ribs on the face plate of the skin panel.

In general, on welding two members, it is desirable that the clearance between the two members is as small as possible for increasing welding reliability. Incidentally, in manufacturing the above-described panel structure, when the frames are welded discontinuously to individual portions between the plurality of ribs on the face plate of the skin panel, each of the welding portions is deformed by thermal influences. Therefore, depending on the order of welding, a large clearance between an inter-portion of the ribs and a frame is formed, by which welding reliability is decreased.

SUMMARY OF THE INVENTION

Under these circumstances, an object of the present invention is to provide a method for manufacturing a panel structure which is capable of increased welding reliability when welding a frame to a face plate.

In order to solve the above problem, the present invention adopts the following method. That is, a first aspect of the present invention relates to a method for manufacturing a panel structure by joining a frame to one face of a face plate. In joining the frame thereto, a reference position of a first frame in an axial direction is first welded (first welding) to the one face, after the first welding, a not-yet-welded position closest to the reference position in the axial direction is second welded (second welding) to the one face and, subsequently, welding is performed discontinuously to the one face from the not-yet-welded position closest to the reference position at portions on both sides in the axial direction on the basis of the reference position.

Further, a second aspect of the present invention relates to the method for manufacturing the panel structure in which a plurality of ribs are mounted parallel to each other on one face of a face plate and a frame is joined so as to intersect a rib direction, that is, a direction in which each of the ribs extends. In the above method, there are performed a skin panel manufacturing process for manufacturing the skin panel in which the plurality of ribs are mounted parallel to each other on the one face of the face plate and a joining process for joining the frame to the one face of the face plate of the skin panel. In the joining process, among welding positions of the frame opposing individual segments divided by the plurality of ribs on the one face, a welding position at a central part is welded to the one face in the axial direction in which the frame extends, after welding of the welding position at the central part, the portions on both sides in the axial direction on the basis of the welding position at the central part may be welded discontinuously to the one face from a welding position close to the welding position at the central part.

In the manufacturing methods described in the first and the second aspects of the present invention, in the axial direction, first, the reference position of the frame (the welding position at the central part of the frame) is welded to the face plate, thereafter, welding is sequentially performed to the face plate toward both external sides from a position close to the reference position. Therefore, even if a gap is formed between a welding position of the frame and the face plate, the gap can be easily removed. Thus, at any point in time until welding of all the welding positions is completed, a welding position which is not yet welded on the face plate is supported in a cantilevered manner. As a result, when welded an external welding position which is not yet welded adjacent to an already-welded welding position in the frame, the face plate is only slightly pressed to the external welding position, by which the face plate is allowed to be in contact with the welding position which is not yet welded in the frame. Further, even if the face plate is deformed in a direction spaced away from the frame due to thermal influences resulting from welding for every welding of the external welding position in the frame, the face plate is slightly pressed to the external welding position for every welding of the external welding position in the frame and the face plate is welded, with the face plate being in contact with the external welding position. Thereby, the accumulated deformation for every welding can be suppressed as much as possible.

Therefore, according to the manufacturing methods described in the first and the second aspects of the present invention, it is possible to increase the welding reliability between the face plate and the frame.

Further, the reference position is preferably positioned at the central part of the frame in the axial direction.

Where the reference position is positioned at the central part of the frame in the axial direction, accumulated deformation can be suppressed at each position on both ends in the axial direction on the basis of the reference position even if the face plate undergoes some deformation during every welding.

Further, a third aspect of the present invention relates to the method for manufacturing the panel structure in which after the reference position of the frame is first welded, a not-yet-welded position closest to the reference position on one side in the axial direction is second welded (second welding) on the basis of the reference position, then, a not-yet-welded position closest to the reference position on the other side in the axial direction is third welded (third welding) on the basis of the reference position and, subsequently, the second welding and the third welding may be performed alternately in a discontinuous manner.

In the manufacturing method described in the third aspect, the face plate on both sides in the axial direction can be made substantially uniform in welding deformation on the basis of the reference position, by which lopsided welding deformation can be suppressed. As a result, it is possible to suppress the amount of welding deformation.

Further, a fourth aspect of the present invention relates to the method for manufacturing the panel structure in which, where a second frame arranged parallel to the first frame is also joined to the one face, among a plurality of welding positions to be sequentially welded to the first frame, after welding of a first welding position and prior to welding of a second welding position, a not-yet-welded position of the second frame corresponding to the first welding position may be welded to the one face. Still further, where a third frame arranged parallel to the first frame on the other side of the second frame is also joined to the one face on the basis of the first frame, a not-yet-welded position of the third frame corresponding to a welding position immediately before may be welded to the one face between welding of the second frame and welding of the first frame to be performed immediately thereafter.

Further, a fifth aspect of the present invention relates to the method for manufacturing the panel structure in which, where a plurality of frames including the first frame are joined parallel to each other to the one face, among a plurality of welding positions to be sequentially welded in the first frame, after welding of a first welding position and prior to welding of a second welding position, a not-yet-welded position of each frame corresponding to the first welding position of the first frame may be discontinuously welded sequentially from a not-yet-welded position closest to the first welding position.

Still further, a sixth aspect of the present invention relates to the method for manufacturing the panel structure in which, where a plurality of frames including the first frame are joined parallel to each other to the one face, a first frame welding is performed in which only one not-yet-welded position among a plurality of welding positions in the first frame is partially welded, then, at a frame welding position on the one face closest to the first frame in a frame arraying direction in which the plurality of frames are arrayed, a second frame welding is performed in which only a not-yet-welded position corresponding to the one not-yet-welded position is partially welded in another frame, and until frame welding in which only a not-yet-welded position corresponding to the one not-yet-welded position is partially welded in each frame is completed with regard to all the frames, frame welding is performed discontinuously on the one face from a frame welding position not yet welded and closest to the first frame and, subsequently, until welding of all positions to be welded in each frame is completed with regard to all the frames, the first frame welding, the second frame welding and frame welding continuing to the second frame welding may be performed repeatedly.

In this instance, after the second frame welding, another frame is further subjected to a third frame welding on the one face at a frame welding position not yet welded and closest to the first frame on the side of the frame arraying direction which is opposite to a position of the second frame welding on the basis of the first frame and, subsequently, the second frame welding and the third frame welding may be performed alternately.

In the method for manufacturing the panel structure having a plurality of frames in the present invention, each of the frames is welded to a reference frame welding position on the face plate in the frame arraying direction and, thereafter, the frames are sequentially welded to individual frame welding positions toward both external sides. Therefore, even if a gap is formed between the face plate and the frame, it is possible to easily remove the gap. This is due to the fact that a welding position not yet welded on the face plate is supported in a cantilevered manner, at any point in time until frame welding at all frame welding positions is completed. Further, even if the face plate is deformed in a direction spaced away from the frame due to thermal influences resulting from welding for every welding of the frame to frame welding positions on the face plate, the face plate is slightly pressed to the frame and welded, with the face plate being in contact with the frame for every welding of the frame. It is, thereby, the accumulated deformation for every welding can be suppressed as much as possible.

Further, a seventh aspect of the present invention relates to the method for manufacturing the panel structure in which the first frame may be welded to a central part in a direction in which each of the frames is arrayed on the one face.

In the method for manufacturing the panel structure described in the seventh aspect, welding of the first frame to the central part in the frame arraying direction makes it possible to suppress accumulated deformation at each position on both ends in the frame arraying direction on the basis of the first frame, even if the face plate undergoes some deformation during every welding of each frame.

Further, the one face of the face plate may be welded to each of the frames by friction stir welding.

If a gap is formed between objects to be welded on friction stir welding which is a kind of welding free of a filler metal, it is impossible to fill the gap by using the filler metal. Therefore, the above-described manufacturing method is performed to easily remove a gap between objects to be welded, by which the friction stir welding can be increased in reliability.

Further, an eighth aspect of the present invention relates to the method for manufacturing the panel structure in which the frame is provided with a flange portion opposing the one face and a frame main body which is erected from the flange portion in a direction spaced away from the one face, and the one face of the face plate and the flange portion of the frame may be subjected to the friction stir welding.

According to the individual aspects of the present invention, even if a gap is formed between the face plate and the frame due to welding deformation and the like, the gap can be easily removed. It is, thereby, possible to increase the welding reliability.

PREFERRED EMBODIMENTS

First Embodiment

Hereinafter, a description will be given of a first embodiment of a method for manufacturing a panel structure according to the present invention with reference to the drawings. The panel structure is utilized, for example, as a construction material of an external wall panel for tracked vehicles.

First, a description will be given of a constitution of the panel structure of the present embodiment.

Figure 1:
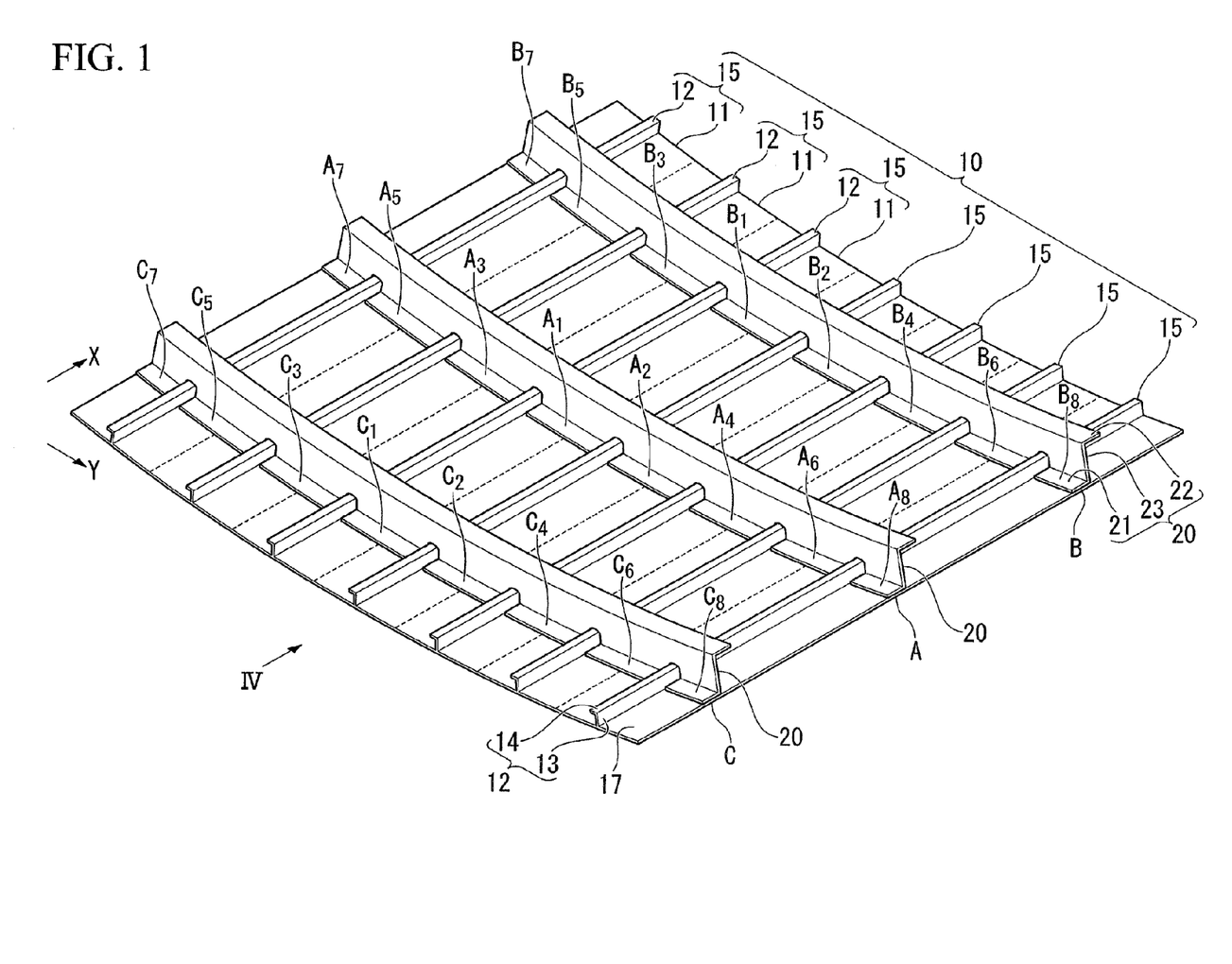
FIG. 1 is a perspective view of a panel structure of one embodiment according to the present invention.

As shown in FIG. 1, the panel structure of the first embodiment is provided with a face plate 17, n-numbers (n is a natural number of two or more) of ribs 12 mounted parallel to each other on one face of the face plate 17 and m-numbers (m is a natural number of two or more) of frames 20 mounted parallel to each other on the one face in a direction intersecting a direction in which each of these ribs 12 extends. In giving the following description, a direction in which each of the ribs 12 extends is given as a rib direction (frame arraying direction) X, while a direction in which each of the frames 20 extends is given as a frame direction (axial direction) Y.

Figure 4:
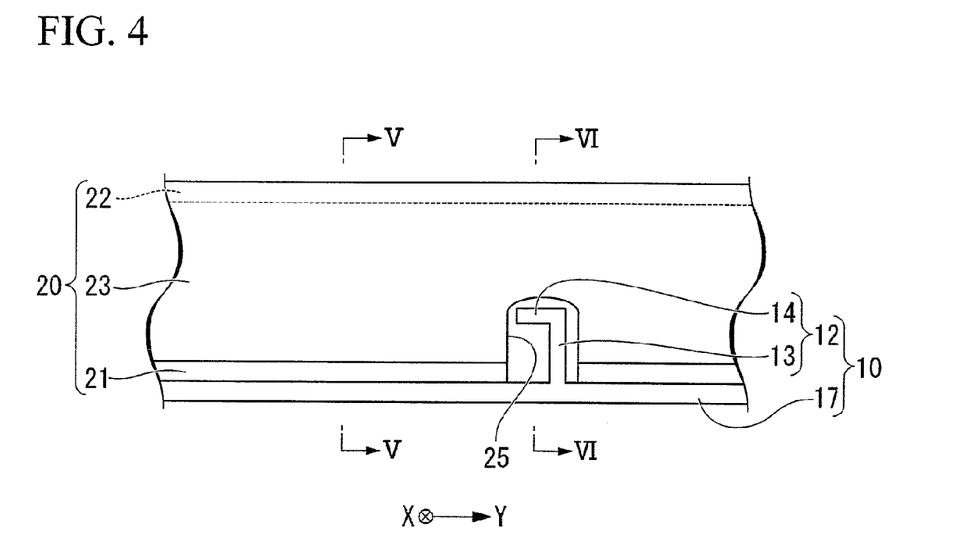
FIG. 4 is a drawing viewed along the arrow IV in FIG. 1.

As shown in FIG. 1 and FIG. 4, the rib 12 is provided with a rib main body 13 erected perpendicularly from one face of the face plate 17 and a flange portion 14 extending from an end of the rib main body 13 in a direction parallel to the face plate 17. In other words, the rib 12 assumes an L-shaped cross section which is perpendicular to the rib direction X, and one arm portion of L is the rib main body 13, while the other arm portion of L is the flange portion 14.

Figure 5:
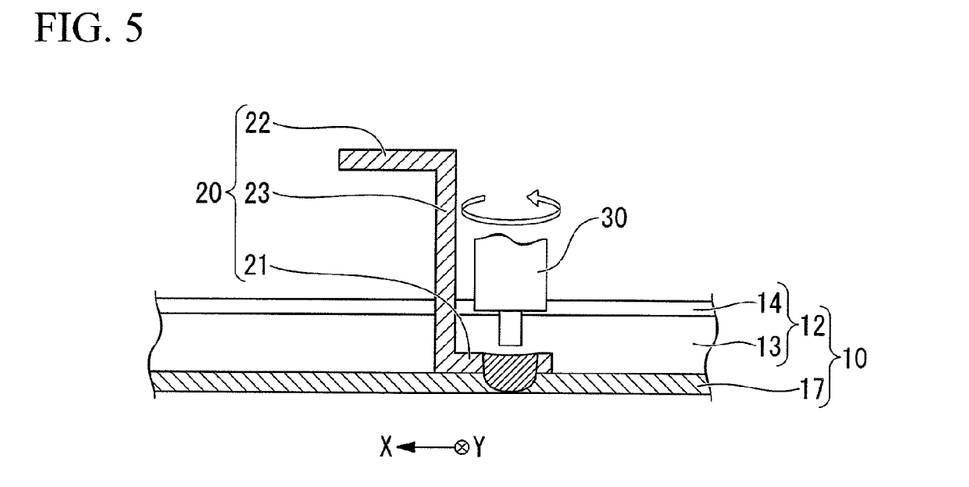
FIG. 5 is a cross sectional view taken along the line V-V in FIG. 4.

As shown in FIG. 1 and FIG. 5, a frame 20 is provided with a frame main body 23 erected from one face of the face plate 17, a first flange portion 21 opposing the face plate 17 and extending to one side in the rib direction X from an end of the frame main body 23 on the face plate 17 side and a second flange portion 22 opposing the face plate 17 and extending to the other side in the rib direction X from an end of the frame main body 23 on the side far from the face plate 17. In other words, the frame 20 assumes a Z shaped cross section which is perpendicular to the frame direction Y, and one arm portion of Z is the first flange portion 21, while the other arm portion of Z is the second flange portion 22.

Figure 6:
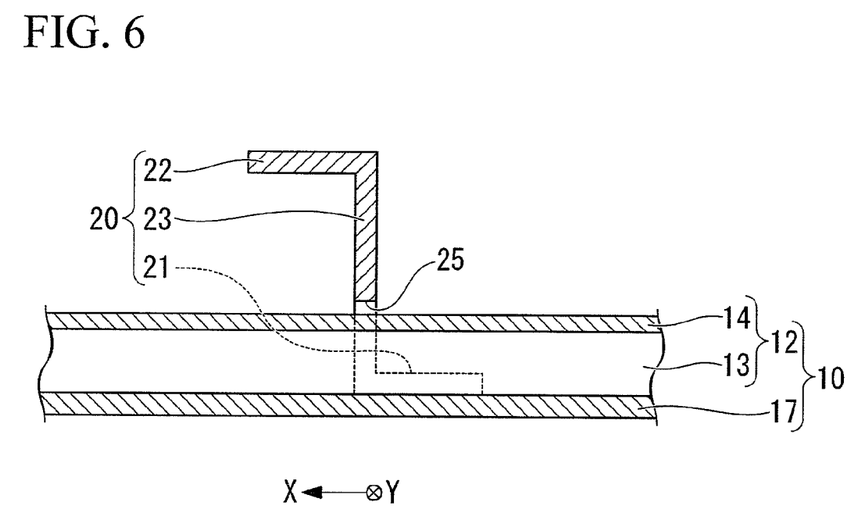
FIG. 6 is a cross sectional view taken along the line VI-VI in FIG. 4.

As shown in FIG. 1, FIG. 4 and FIG. 6, the frame 20 is also provided with a notch 25 which penetrates perpendicularly with respect to the frame direction Y to avoid interference with the rib 12. The notch 25 is formed at the first flange portion 21 and the frame main body 23.

Figure 7:
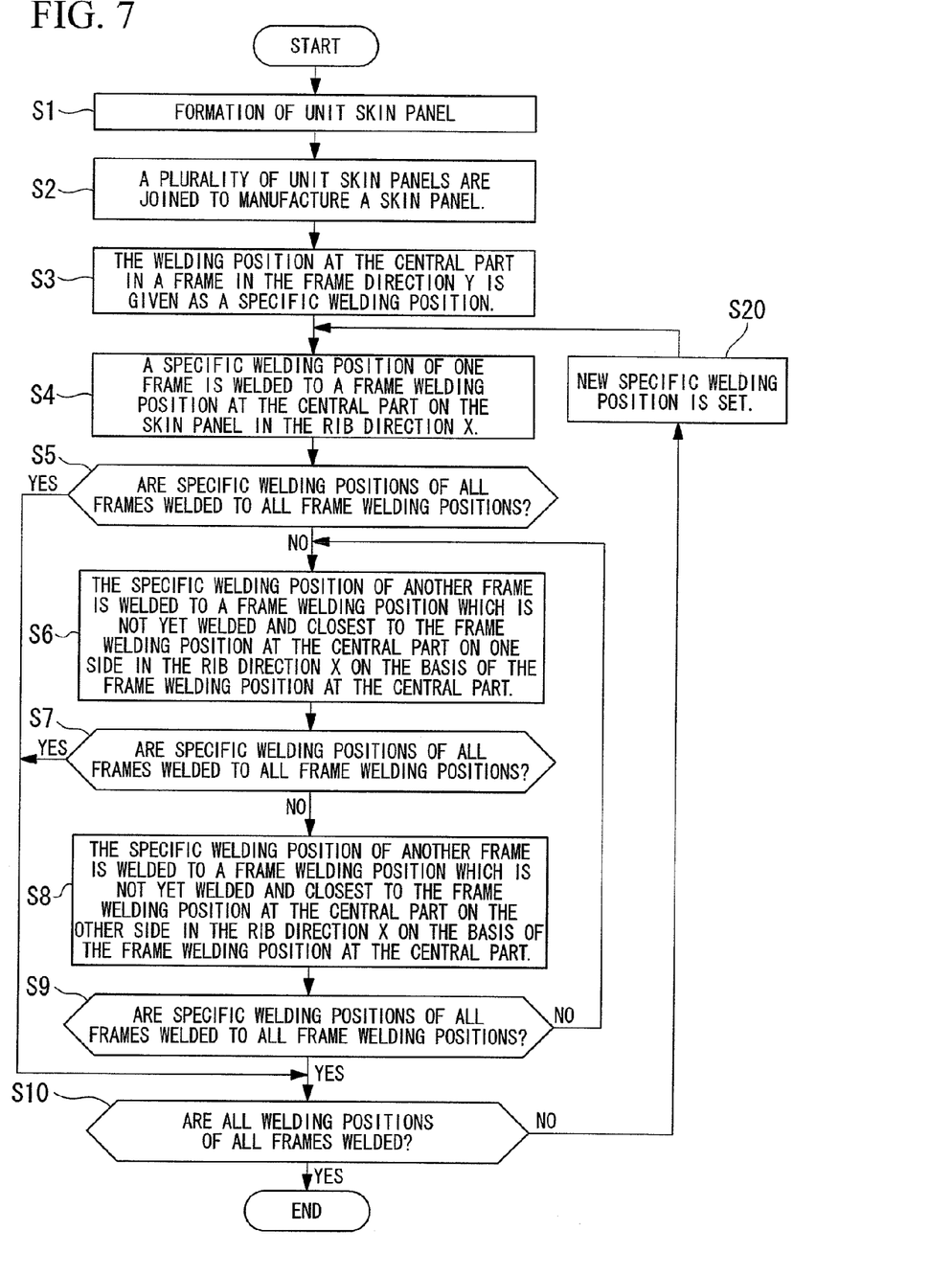
FIG. 7 is a flowchart which shows procedures of manufacturing the panel structure of one embodiment according to the present invention.

Next, a description will be given of the method for manufacturing the panel structure described above with reference to the flowchart given in FIG. 7.

Figure 2:
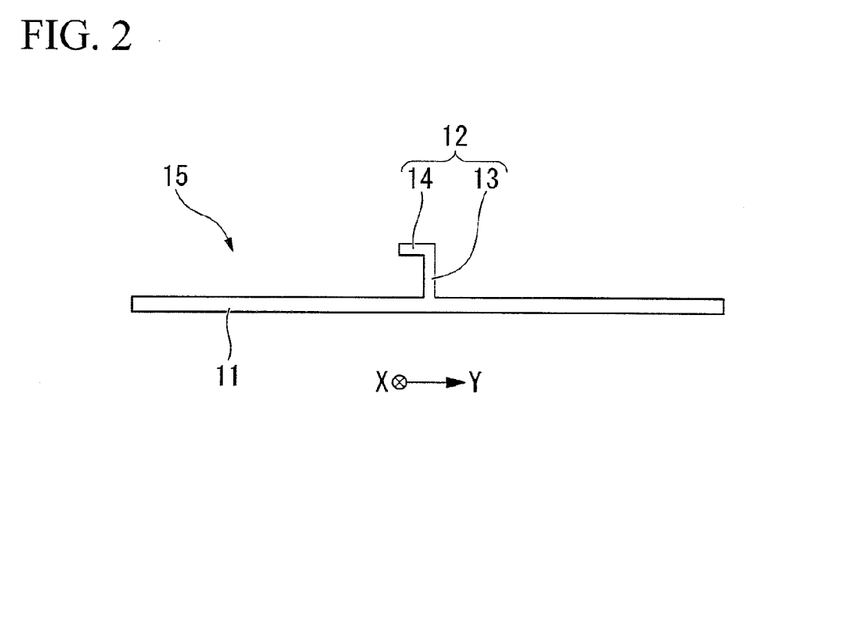
FIG. 2 is a front elevational view of a unit skin panel of one embodiment according to the present invention.

First, as shown in FIG. 1 and FIG. 2, there is formed a unit skin panel 15 made up of one piece of the rib 12 and a unit plate 11 equal in thickness to the face plate 17 (S1). The unit plate 11 is equal in length in the rib direction X to the face plate 17. Further, the length of the unit plate 11 in the frame direction Y corresponds to 1/n of the length of the face plate 17 in the frame direction Y. The face plate 17 is that in which n-numbers of unit plates 11 are arrayed in the frame direction Y and joined to each other.

The unit skin panel 15 is formed by using a mold having a hole corresponding to the shape of the cross section perpendicular to the rib direction X to extrude, for example, an aluminum alloy softened by heating.

Figure 3:
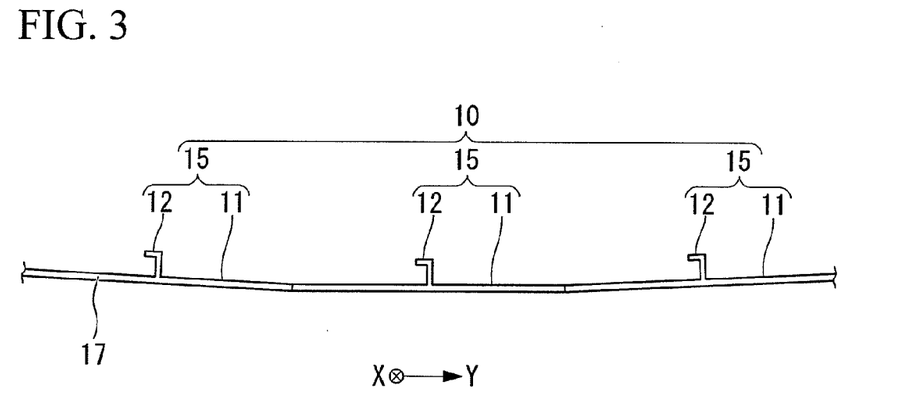
FIG. 3 is a front elevational view of a skin panel of one embodiment according to the present invention.

Then, as shown in FIG. 3, the unit plates 11 of the plurality of unit skin panels 15 are joined to each other to manufacture the skin panel 10 (S2). In this instance, an end edge of the unit plate 11 constituting one unit skin panel 15 in the frame direction Y is joined to an end edge of a unit face plate 17 constituting another unit skin panel 15 in the frame direction Y.

In the present embodiment, the unit plates 11 of the plurality of unit skin panels 15 are joined to each other to manufacture the skin panel 10. However, the skin panel 10 may be manufactured by welding a plurality of ribs 12 parallel to each other on one face of a plate which forms the face plate 17 of the panel structure.

In the above-manufactured skin panel 10, the n-numbers of ribs 12 are mounted parallel to each other on one face of the face plate 17 of the panel structure. In the panel structure, the m-numbers of frames 20 are mounted parallel to each other in the rib direction X on the one face of the face plate 17 of the skin panel 10. Therefore, the skin panel 10 is provided with m-numbers of frame welding positions arrayed in the rib direction X as frame welding positions at which each of the frames 20 is welded.

Then, the welding position at the central part of the frame 20 in the frame direction (axial direction) Y is set as a specific welding position of the frame (S3).

The welding position in the frame 20 is segmented in the frame direction Y into (n+1) sites by the n-numbers of ribs 12 mounted on one face of the skin panel 10. Thus, in the present embodiment, among welding positions at (n+1) sites in the frame 20, first, the welding position (reference position) of the central part in the frame direction (axial direction) Y is given as the specific welding position of the frame 20.

In this instance, the welding position at the central part of the frame 20 in the frame direction Y is one welding position which is a welding position at a site where, among welding positions at (n+1) sites, the number from a welding position at one end in the frame direction Y is in agreement with the number from a welding position at the other end. More specifically, when (n+1) is an odd number, for example, seven welding positions are available, a welding position which is the $4^{th}$ position from the welding position at one end in the frame direction Y and also the $4^{th}$ position from the welding position at the other end in the frame direction Y is given as the welding position at the central part. Further, when (n+1) is an even number, for example, eight welding positions are available, one welding position which is one of the $4^{th}$ welding position from the welding position at one end in the frame direction Y and the $4^{th}$ welding position from the welding position at the other end in the frame direction Y is given as the welding position at the central part.

Then, among m-numbers of frame welding positions arrayed on the skin panel 10 in the rib direction (frame arraying direction) X, the specific welding position of one frame (a first frame) 20 is welded to the frame welding position (frame reference position) at the central part in the rib direction X (S4).

In this instance, the frame welding position at the central part in the rib direction X is one welding position which is a welding position at a site where, among the above-described m-numbers of frame welding positions, the number from a frame welding position at one end in the rib direction X is in agreement with the number from a frame welding position at the other end. More specifically, when m is an odd number, for example, three frame welding positions are available, a welding position which is the $2^{nd}$ position from a frame welding position at one end in the rib direction X and also the $2^{nd}$ position from a frame welding position at the other end in the rib direction X is given as the welding position at the central part. Further, when m is an even number, for example, four frame welding positions are available, one welding position which is one of the $2^{nd}$ frame welding position from a frame welding position at one end in the rib direction X and the $2^{nd}$ frame welding position from a frame welding position at the other end in the rib direction X is given as the welding position at the central part.

In the present embodiment, welding positions in the frame 20 are welded to the corresponding positions on the skin panel 10 by adopting a friction stir welding method. As shown in FIG. 5, in the friction stir welding, the first flange portion 21 of the frame 20 is superimposed on the face plate 17 of the skin panel 10, and a rotating tool 30 is pressed to the superimposed portion while being rotated, by which the rotating tool 30 is moved in the frame direction Y. In the friction stir welding, a material which forms the superimposed portion is subjected to plastic flow, by which the members superimposed onto each other are joined. In the example shown in FIG. 5, the rotating tool 30 is brought closer to the face plate 17 from a side on which the frame 20 is joined. However, the face plate 17 may be joined to the frame 20 by bringing the rotating tool 30 close to the face plate 17 from a side opposite to a side on which the frame 20 is joined.

If the above-described welding (S4) does not complete welding of specific welding positions of all the frames 20 to all frame welding positions (S5), the specific welding position of another frame 20 (a second frame) is welded to a frame welding position not yet welded and closest to the frame welding position at the central part which is on one side in the rib direction X on the basis of the frame welding position at the central part (S6).

Even if the above welding (S6) does not complete welding of the specific welding positions of all the frames 20 to all the frame welding positions (S7), the specific welding position of another frame (a third frame) 20 is welded to a frame welding position not yet welded and closest to the frame welding position at the central part which is on the other side in the rib direction X on the basis of the frame welding position at the central part (S8).

Further, even if the above welding (S8) does not complete welding of the specific welding positions of all the frames 20 to all the frame welding positions (S9), the processing returns again to Step 6. The processing in Steps 7 to 9 and 6 is performed repeatedly until welding of the specific welding positions of all the frames 20 to all the frame welding positions is completed.

On the other hand, if welding in Steps 6 and 8 completes welding of the specific welding positions of all the frames 20 to all the frame welding positions (S7, 9), a determination is made for whether all the welding positions of all the frames have been welded or not (S10).

When a determination is made that all the welding positions of all the frames have been welded in Step 10, a series of processing is terminated. On the other hand, when a determination is made that all the welding positions of all the frames have not been welded in Step 10, a new specific welding position in a frame is set (S20). Processing returns to Step 4, and the specific welding position of each frame is welded.

Figure 8:
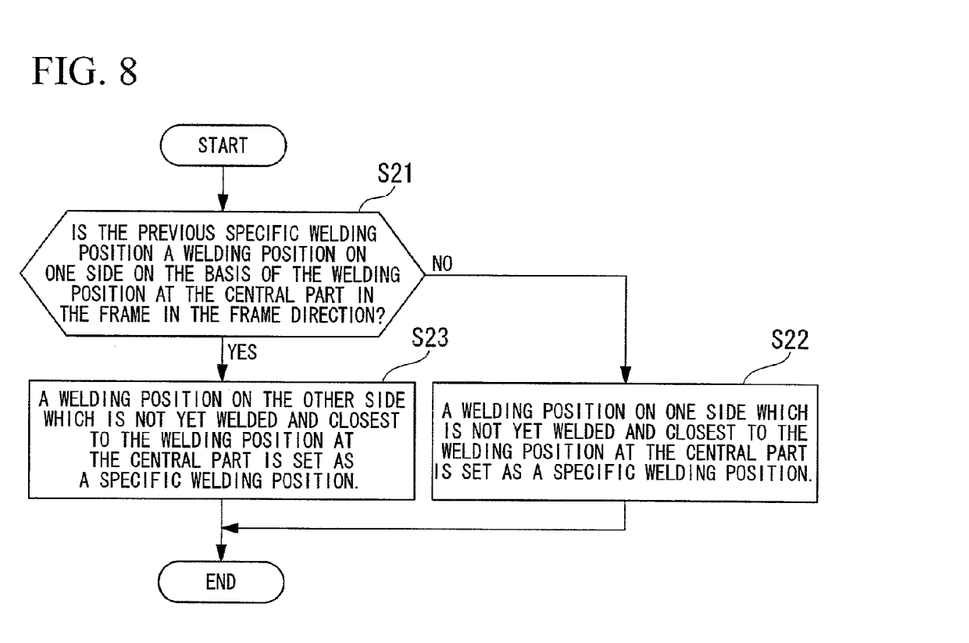
FIG. 8 is a flowchart which shows details of processing in Step 20 in FIG. 7.

Next, a description will be given of detailed procedures of the above-described Step 20 with reference to the flowchart in FIG. 8.

First, a determination is made as to whether or not the previous specific welding position has been a welding position on one side on the basis of the welding position at the central part of the frame in the frame direction Y (S21).

When a determination is made in Step 21 that the previous specific welding position is not a welding position on one side ((+) Y side) on the basis of the welding position at the central part of the frame in the frame direction Y, that is, it is a welding position on the other side ((−) Y side) or the welding position at the central part, a welding position not yet welded and closest to the central part which is a welding position on the one side ((+) Y side) is set as a specific welding position on the basis of the welding position at the central part of the frame in the frame direction Y (S22).

Further, when a determination is made in Step 21 that the previous specific welding position is a welding position on one side ((+) Y side) on the basis of the welding position at the central part of the frame in the frame direction Y, a welding position not yet welded and closest to the central part which is a welding position on the other side ((−) Y side) is set as a specific welding position on the basis of the welding position at the central part of the frame in the frame direction Y (S23).

When the specific welding position is set by processing in Step 22 or Step 23, processing in Step 20 is completed and processing returns to Step 4. In Step 4, the specific welding position set in Step 20 is welded as described previously.

More specifically, in the example shown in FIG. 1, first, among the frame welding positions A, B, C on the skin panel 10 in the rib direction (frame arraying direction) X, one frame 20 is welded to the frame welding position A at the central part in the rib direction X. In this instance, among individual welding positions $A_1$, $A_2$, $A_3$, to $A_8$ in the frame 20, the welding position $A_1$ at the central part in the frame direction (axial direction) Y is given as a specific welding position, and only the specific welding position is welded to the frame welding position A on the skin panel 10.

Then, among the frame welding positions A, B, C on the skin panel 10 in the rib direction X, the frame 20 is welded to the frame welding position B on the (+) X side in the rib direction X on the basis of the frame welding position A at the central part. Also when the frame is welded, as described previously, the welding position $B_1$ at the central part of the frame 20 in the frame direction Y is given as a specific welding position and only the specific welding position is welded to the frame welding position B on the skin panel 10.

Then, among the frame welding positions A, B, C on the skin panel 10 in the rib direction X, the frame 20 is welded to the frame welding position C on the (−) X side in the rib direction X on the basis of the frame welding position A at the central part. Also when the frame is welded, as described previously, the welding position $C_1$ at the central part of the frame 20 in the frame direction Y is given as a specific welding position, and only the specific welding position is welded to the frame welding position C on the skin panel 10.

If welding of the specific welding positions of individual frames to the skin panel 10 is not completed with regard to all the frames, welding of the specific welding positions of remaining frames to the frame welding positions on the (+) X side in the rib direction X and welding of the specific welding positions of remaining frames to the frame welding positions on the (−) X side in the rib direction X are performed alternately and repeatedly on the basis of the frame welding position A at the central part.

If welding of the specific welding positions $A_1$, $B_1$, $C_1$ of individual frames to the skin panel 10 is completed with regard to all the frames, a new specific welding position in the frame 20 is welded to the frame welding position A at the central part on the skin panel 10 in the rib direction X. In this instance, on the basis of the welding position $A_1$ at the central part of the frame 20, the welding position $A_2$ not yet welded and closest to the welding position $A_1$ at the central part on (+) Y side in the frame direction Y is given as a new specific welding position.

Then, the new specific welding position of the frame 20 is welded to the frame welding position B on the skin panel 10. In this instance, on the basis of the welding position $B_1$ at the central part of the frame 20, the welding position $B_2$ not yet welded and closest to the welding position $B_1$ at the central part on the (+) Y side in the frame direction Y is given as a new specific welding position.

Then, the new specific welding position of the frame 20 is welded to the frame welding position C on the skin panel 10. In this instance, on the basis of the welding position $C_1$ at the central part of the frame 20, the welding position $C_2$ not yet welded and closest to the welding position $C_1$ at the central part on the (+)Y side in the frame direction Y is given as a new specific welding position.

If welding of the specific welding positions of individual frames to the skin panel 10 is not completed with regard to all the frames, welding of the specific welding positions of remaining frames to the frame welding positions on the (+) X side in the rib direction X and welding of the specific welding positions of remaining frames to the frame welding positions on the (−) X side in the rib direction X are performed alternately and repeatedly on the basis of the frame welding position A at the central part.

If welding of the specific welding positions $A_2$, $B_2$, $C_2$ of individual frames to the skin panel 10 is completed with regard to all the frames, a new specific welding position in the frame 20 is welded to the frame welding position A at the central part on the skin panel 10 in the rib direction X. In this instance, on the basis of the welding position $A_1$ at the central part of the frame 20, the welding position $A_3$ not yet welded and closest to the welding position $A_1$ at the central part on the (−)Y side in the frame direction Y is given as a new specific welding position.

In the present embodiment, welding is performed in the order of the following positions 1 to 17.
1. Welding position $B_3$
2. Welding position $C_3$
3. Welding position $A_4$
4. Welding position $B_4$
5. Welding position $C_4$
6. Welding position $A_5$
7. Welding position $B_5$
8. Welding position $C_5$
9. Welding position $A_6$
10. Welding position $B_6$
11. Welding position $C_6$
12. Welding position $A_7$
13. Welding position $B_7$
14. Welding position $C_7$
15. Welding position $A_8$
16. Welding position $B_8$
17. Welding position $C_8$ In other words, in the present embodiment, among the frame welding positions A, B, C on the skin panel 10 in the rib direction X, first, the frame welding position A at the central part is welded. Then, the frame welding position B on the (+) X side in the rib direction X and the frame welding position C on the (−)Y side are welded alternately and repeatedly on the basis of the frame welding position A at the central part. Further, in the present embodiment, when attention is given to welding of one frame 20 to one frame welding position (for example, the welding position A), first, the welding position $A_1$ at the central part of the frame 20 in the frame direction Y is welded. Then, until welding of all the welding positions of the frame 20 is completed, the welding positions $A_2$, $A_4$, $A_6$, $A_8$ on the (+)Y side in the frame direction Y and the welding positions $A_3$, $A_5$, $A_7$ on the (−)Y side are welded alternately and repeatedly on the basis of the welding position $A_1$ at the central part.

When one frame 20 is welded to one welding position on the skin panel 10, such an assumption is made that, for example, in an order reverse to the above-described welding order, welding positions on both external sides of the frame 20 in the frame direction Y are welded and, then, each of welding positions is sequentially welded toward the central part.

In this instance, at a point in time when the welding positions on both external sides of the frame 20 are welded, the skin panel 10 is to undergo deformation due to thermal influences resulting from welding of the welding positions on both external sides and a relatively large gap is to develop between the welding position at the central part of the frame 20 and the skin panel 10. A not-yet-welded position on the skin panel 10 has been kept supported on both sides by the frame 20 at this point in time. Therefore, when a welding position on the central side adjacent to an already-welded welding position in the frame 20 is welded, the skin panel 10 is not in contact with the welding position on the central side if the skin panel 10 is not pressed to the welding position on the central side by a force greater than an ordinary force. In particular, when the welding position at the central part is finally welded, a not-yet-welded portion in the skin panel 10 is short in the frame direction Y. In other words, due to a short supporting clearance between both sides by the frame 20, the skin panel 10 is not in contact with the welding position at the central part if the skin panel 10 is not pressed to the welding position at the central part by a force greater than an ordinary force.

Further, if the skin panel 10 is deformed in a direction spaced away from the frame 20 for every welding of the welding position at the central side in the frame 20, the amount of deformation will be accumulated excluding a case where welding is performed by removing a gap between the skin panel 10 and the frame 20. In addition, a gap between the welding position at the central part and the skin panel 10 will increase gradually.

When a welding position on the central side adjacent to an already-welded welding position in the frame 20 is to be welded and welding is performed in a state that a gap is formed between the welding position on the central side in the frame 20 and the skin panel 10 only by slightly pressing the skin panel 10 to the welding position on the central side, the welding reliability thereof will be undeniably decreased. In particular, where friction stir welding which is one type of welding free of a filler metal is performed, no gap will be filled by the filler metal. Therefore, the welding reliability will decrease rapidly if objects to be welded are not in contact with each other.

On the other hand, on welding one frame 20 to the skin panel 10, as described in the present embodiment, the welding position at the central part of the frame 20 is first welded in the frame direction Y and, thereafter, individual welding positions are sequentially welded toward both external sides. In this welding, even if a gap is formed between a welding position in the frame 20 and the skin panel 10, the gap can be easily removed to obtain high welding reliability. In this way, at any point in time until welding of all welding positions is completed, a welding position of the skin panel 10 which is not yet welded is supported in a cantilevered manner. Therefore, on welding a welding position which is not yet welded on an external side adjacent to an already-welded welding position in the frame 20, the skin panel 10 is allowed to be in contact with the welding position which is not yet welded only by slightly pressing the skin panel 10 to an external welding position. Further, even if the skin panel 10 is deformed in a direction spaced away from the frame 20 for every welding of the external welding position in the frame 20, the skin panel 10 is slightly pressed to the external welding position for every welding of the external welding position in the frame 20 and welding is performed, with the skin panel 10 being in contact with the external welding position. Thereby, it is possible to avoid deformation from accumulating during every welding.

Further, in the first embodiment, when a plurality of frames 20 are welded to the skin panel 10, a frame 20 is welded to the frame welding position A at the central part on the skin panel 10 in the rib direction (frame arraying direction) X, and, thereafter, the other frames 20 are sequentially welded to the individual frame welding positions B, C toward both external sides. Thus, as described previously, even if a gap is formed between the skin panel 10 and each of the frames 20, the gap can be easily removed. Further, even if the skin panel 10 is deformed for every welding of the frames 20 to frame welding positions on the skin panel 10, the frame welding position is slightly pressed to the frames 20 for every welding of the frames 20 to the frame welding positions on the skin panel 10, and welding is performed, with the frame welding positions being in contact with the frames 20. Thereby, it is possible to avoid deformation from accumulating during every welding.

Therefore, in the present embodiment, it is possible to increase welding reliability between each of the frames 20 and the skin panel 10.

Next, a description will be given of modified examples of the first embodiment described above (a second embodiment and a third embodiment).

In the first embodiment, one unit of welding machine (friction stir welding machine) was used to manufacture the panel structure. On the other hand, in the second and the third embodiments which will be described hereinafter, a panel structure is welded by using a plurality of welding machines.

Second Embodiment

First, a description will be given of the second embodiment.

Where attention is given to welding of one frame 20 to one frame welding position on a skin panel 10 (for example, the welding position A), in the first embodiment, with reference to FIG. 1, the welding position $A_1$ at the central part in the frame direction Y is welded to the skin panel 10 and, thereafter, until welding of all the welding positions $A_1$, $A_2$, $A_3$, to $A_8$ in the frame 2 is completed, welding of the welding positions $A_2$, $A_4$, $A_6$, $A_8$ which are not yet welded on the (+) Y side in the frame direction Y and welding of the welding positions $A_3$, $A_5$, $A_7$ which are not yet welded on the (−) Y side in the frame direction Y are performed alternately and repeatedly.

On the other hand, in the second embodiment, with reference to FIG. 1, on welding one frame 20 to the skin panel 10, the welding position $A_1$ at the central part in the frame direction Y is welded to the skin panel 10, thereafter, the welding position $A_2$ which is not yet welded and closest to the central part on the (+) Y side in the frame direction Y is welded and the welding position $A_3$ which is not yet welded and closest to the central part on the (−) Y side in the frame direction Y is also welded. Hereinafter, the welding position $A_4$ which is not yet welded on the (+) Y side in the frame direction Y and the welding position $A_5$ which is not yet welded on the (−) Y side in the frame direction Y are welded at the same time. Then, the welding position $A_6$ which is not yet welded on the (+) Y side in the frame direction Y and the welding position $A_7$ which is not yet welded on the (−) Y side in the frame direction Y are welded at the same time, and the welding position $A_8$ which is not yet welded on the (+) Y side in the frame direction Y is finally welded.

In other words, in the second embodiment, the welding position $A_1$ at the central part in the frame direction Y is welded to the skin panel 10 by one welding machine. Thereafter, in the frame direction Y, the welding positions $A_2$, $A_3$, $A_4$, $A_5$, $A_6$, $A_7$ symmetrically placed at two sites are welded at the same time by two welding machines on the basis of the welding position $A_1$ at the central part.

Therefore, in the second embodiment, two welding positions are welded at the same time by two welding machines, thus making it possible to decrease the manufacturing time.

Third Embodiment

Next, a description will be given of the third embodiment.

When a plurality of frames 20 are welded to the skin panel 10, in the first embodiment, in the rib direction X, a specific welding position of one frame 20 is welded to a frame welding position of the skin panel 10 and, thereafter, specific welding positions of the other frames are welded.

On the other hand, in the third embodiment, when a specific welding position of a certain frame 20 in the frame direction Y is welded to the skin panel 10, specific welding positions of the other frames 20 in the frame direction are also welded at the same time to the skin panel 10.

In other words, in the third embodiment, with reference to FIG. 1, a plurality of welding positions $A_1$, $B_1$, $C_1$ corresponding to each other between a plurality of frames 20, 20, 20 are welded at the same time to the skin panel 10 by a plurality of welding machines Further, in the third embodiment, one frame is welded to the skin panel using the same procedures as in the first embodiment. Therefore, the plurality of welding positions $A_1$, $B_1$, $C_1$ corresponding to each other between the plurality of frames 20, 20, 20 are welded at the same time to the skin panel 10 by the plurality of welding machines and, thereafter, a plurality of welding positions $A_2$, $B_2$, $C_2$ corresponding to each other between a plurality of frames 20, 20, 20 are welded at the same time by the plurality of welding machines and, subsequently, in a similar manner, the welding positions $A_3$, $B_3$, $C_3$, $A_4$, $B_4$, $C_4$, (subsequent positions will be omitted) corresponding to each other between a plurality of frames 20, 20, 20 are welded at the same time by the plurality of welding machines.

As described so far, in the third embodiment as well, a plurality of welding positions are welded at the same time by a plurality of welding machines, thus making it possible to decrease the manufacturing time.

In any of the above-described first to the third embodiments, when viewed along the arrow IV in FIG. 1, the face plate 17 is curved, with the frame side given as a curvature center, and the frame 20 is curved in the frame direction accordingly. However, the present invention shall not be limited thereto and may be that in which the face plate 17 is curved, with the side opposite to the frame 20 given as a curvature center, or the face plate 17 is not curved.

Incidentally, where both the skin panel and the frame are curved, the skin panel and the frame tend to increase in manufacturing error, as compared with a case where neither the skin panel nor the frame is curved. Therefore, the manufacturing error and the above-described welding distortion tend to contribute to a large gap between the face plate of the skin panel and the frame. As a result, where both the skin panel and the frame are curved, the method for manufacturing the panel structure in the present invention is applied, by which a gap between the face plate of the skin panel and the frame can be removed to secure welding reliability.

Further, in the first to the third embodiments, there is illustrated a panel structure utilized as a construction material for an external wall panel of tracked vehicles. However, the present invention shall not be limited thereto and may be applicable to a panel structure utilized in a construction material for an external wall panel of aircraft, boats and ships as well as to a panel structure utilized in a construction material for a wall panel and others of various types of structures.

The present invention shall not be restricted by the above description but will be restricted only by the scope of the attached claims.

What is claimed is:

1. A method for manufacturing a panel structure by joining a frame to one face of a face plate by welding a plurality of positions arranged in the axial direction of the frame to the face plate, said method comprising:

performing a first welding in which a reference position of a plurality of positions to be welded arranged in the axial direction of a first frame is first welded to the one face, performing a second welding in which a not-yet-welded position closest to the reference position of the plurality of positions to be welded arranged in the axial direction of the first frame is welded to the one face, and after the first and second weldings, repeating a welding process in which a not-yet-welded position closest to the reference position of the plurality of positions to be welded arranged in the axial direction of the first frame is welded to the one face, wherein the first frame is one of a plurality of frames joined parallel to each other to the one face, after each welding of the first frame, a not-yet welded position of each frame other than the first frame corresponding to a last welding position of the first frame is welded to the one face starting from the frame closest to the first frame, until partial frame welding in which a not-yet-welded position corresponding to the last welding position of the first frame is welded in each frame, partial frame welding is performed discontinuously on the one face from a not-yet welded position of the frame closest to the first frame, until welding of all positions to be welded in each frame is completed with regard to all the frames, the partial frame welding is performed repeatedly.

2. The method for manufacturing the panel structure according to claim 1, wherein the reference position is a central part of the first frame in the axial direction.

3. The method for manufacturing the panel structure according to claim 1, wherein the repeating a welding process includes performing a third welding in which on the other side of the reference position from a position of the second welding in the axial direction of the first frame a not-yet-welded position closest to the reference position is welded after the second welding, and repeating the welding process in which a not-yet-welded position closest to the reference position on the opposite side of the reference position from the third welding position in the axial direction of the first frame is welded to the one face.

4. The method for manufacturing the panel structure according to claim 1, wherein the first frame is welded to a central part of the one face in a direction in which the frame is arrayed on the one face.

5. The method for manufacturing the panel structure according to claim 1, wherein the one face of the face plate is welded to the frame by friction stir welding.

6. The method for manufacturing the panel structure according to claim 4, wherein the frame is provided with a flange portion opposing the one face and a frame main body which is erected from the flange portion in a direction spaced away from the one face, and the one face of the face plate and the flange portion of the frame are subjected to friction stir welding.

7. The method for manufacturing the panel structure according to claim 2, wherein the one face of the face plate is welded to the frame by friction stir welding.

8. The method for manufacturing the panel structure according to claim 3, wherein the one face of the face plate is welded to the frame by friction stir welding.

9. The method for manufacturing the panel structure according to claim 4, wherein the one face of the face plate is welded to the frame by friction stir welding.

10. The method for manufacturing the panel structure according to claim 1, wherein each welding of each frame other than the first frame and the frame welded next to the first frame is performed on the opposite side of the first frame from the previous welded frame in a direction in which the frames are arranged.

11. The method for manufacturing the panel structure according to claim 10, wherein the one face of the face plate is welded to the frame by friction stir welding.

* * * * *